United States Patent [19]

Akamatsu

[11] 3,938,482

[45] Feb. 17, 1976

[54] INTERNAL COMBUSTION ENGINE WITH A PLURALITY OF EXHAUST VALVES

[75] Inventor: Hideaki Akamatsu, Susono, Japan

[73] Assignee: Toyota Jidosha Kogyo Kabushiki Kaisha, Japan

[22] Filed: Nov. 27, 1973

[21] Appl. No.: 419,238

[30] Foreign Application Priority Data

Oct. 16, 1973  Japan............................ 48-116190

[52] U.S. Cl................ 123/75 C; 123/26; 123/48 D; 123/191 R; 123/32 C; 123/32 K; 60/294
[51] Int. Cl.² ........................................ F02B 75/02
[58] Field of Search............ 123/48 D, 75 C, 191 S, 123/191 SP, 79 C, 37, 26, 188 AF, 188 N, 59 EC, 90.15, 90.16, 191 R, 32 C, 32 K; 60/597, 613, 620, 294

[56] References Cited
UNITED STATES PATENTS

| | | | |
|---|---|---|---|
| 1,477,944 | 12/1923 | Buchi | 123/75 C |
| 1,904,871 | 4/1933 | Lindberg | 60/620 |
| 3,494,336 | 2/1970 | Myers et al. | 123/90.15 X |
| 3,789,807 | 2/1974 | Pinkerton | 60/597 X |

FOREIGN PATENTS OR APPLICATIONS

| | | | |
|---|---|---|---|
| 59,149 | 4/1954 | France | 123/48 D |
| 68,584 | 5/1958 | France | 123/75 C |
| 270,949 | 5/1927 | United Kingdom | 123/79 C |

Primary Examiner—Wendell E. Burns
Assistant Examiner—James D. Liles
Attorney, Agent, or Firm—Kenyon & Kenyon

[57] ABSTRACT

An internal combustion engine comprising a first exhaust valve arranged in an exhaust port in the exhaust system of said internal combustion engine, and a second exhaust valve arranged in the exhaust port downstream from said first exhaust valve, the timing of the opening of the first exhaust valve being earlier than that of the second exhaust valve, whereby the two valves temporarily form a secondary combustion chamber therebetween.

6 Claims, 6 Drawing Figures

INTERNAL COMBUSTION ENGINE WITH A PLURALITY OF EXHAUST VALVES

DISCLOSURE OF THE INVENTION

This invention relates to internal combustion engines and, in particular, to an improved exhaust system of a combustion chamber thereof.

The unburnt matter, i.e. unburnt hydrocarbon is confirmed as one of the noxious components in the exhaust gas discharged from a conventional gasoline engine. Regarding the cause of unburnt hydrocarbon discharge, though there have been many arguments, the following argument is the most predominant. That is, when the combustion flame is propagated in the combustion chamber and approaches the inner peripheral wall of the combustion chamber, the leading portion of the flame that is commonly called flame-front, is rapidly quenched owing to the step temperature differences between portions adjacent to the inner wall and portions nearest the flame of the combustion chamber. As a result of this, the gas mixture in the portions near the inner wall, hereafter referred to as the boundary layer (that is commonly called the quench zone), cannot be burnt and remains as unburnt hydrocarbon.

Unburnt hydrocarbon thus remaining in the boundary layer together with the burnt matter is discharged out of engine through an exhaust valve. Generally, the exhaust valve is set in such a way that it is opened immediately before the expansion stroke is over, that is, the piston reaches its bottom dead center (B.D.C.). It has been experimentally confirmed that the discharge mass flow rate of the unburnt hydrocarbon is highest immediately after the exhaust valve is opened and also, approximately at the end of the exhaust stroke and that the mass flow rates at both times are approximately equal to each other. It is thought that this initial unburnt hydrocarbon is discharged out of the engine for this reason mentioned above. The reason why the exhaust valve is opened before the piston reaches its B.D.C., as mentioned above, that is, the reason for providing so-called "valve timing" with a lead is so that the exhaust gas can be discharged by its own pressure. In other words, exhaustion during the expansion stroke is mainly produced by rapid pressure variation owing to the opening of the exhaust valve.

It will be easily understood from the above description that the amount of unburnt hydrocarbon, is determined by the thickness of the boundary layer which the combustion flame cannot reach. To reduce, therefore, the amount of unburnt hydrocarbon exhaust, the reduction of the boundary layer or its thickness is essential. However, to reduce the boundary layer or its thickness, it is required to increase the temperature and/or the pressure in the combustion chamber, which, in turn, inevitably involves undesirable problems such as increasing noxious $NO_x$ in the exhaust gas or promoting engine knocking. Therefore, it is very difficult, in practice, to apply a method which can be expected to directly reduce the amount of unburnt hydrocarbon exhaust.

In place of the method stated above which is intended to reduce the quantity of unburnt hydrocarbon exhaust, methods have been used involving secondary combustion of the unburnt hydrocarbon in the exhaust system in order to reduce the amount of unburnt hydrocarbon which is finally discharged out of the engine. However, in these methods or appropriate apparatuses, in order to secondarily burn the unburnt hydrocarbon, it is necessary not only to use a low air-fuel ratio but to supply new secondary air which, in turn, gives rise to an increase in the temperature of the exhaust gas and in fuel consumption.

The main object of the invention is to provide an internal combustion engine with a plurality of exhaust valves which can reduce the amount of the unburnt hydrocarbon.

Although the present invention also rests on the basis of an idea which is intended to secondarily burn the unburnt hydrocarbon in the exhaust system, the present invention may achieve its object without involving the previously mentioned drawbacks.

The invention, other objects and advantages will become more apparent from the detailed description of the preferred embodiments presented below. Reference is made to the accompanying drawings, in which.

Figure 1:
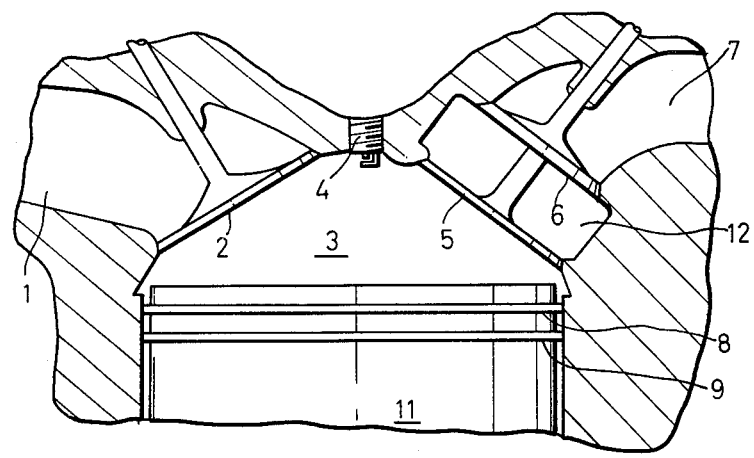
FIG. 1 shows a schematic view of an embodiment of the present invention.
Figure 3A:
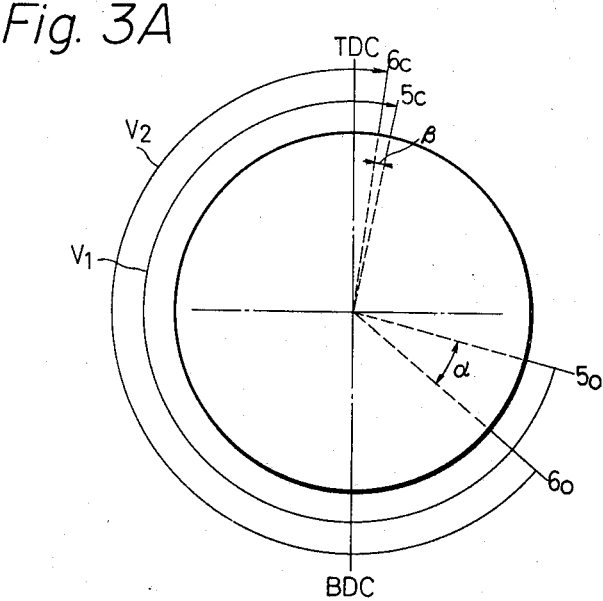
FIG. 3A and FIG. 3B show valve timing diagrams corresponding to FIG. 1 and FIG. 2 respectively.

Referring now to FIGS. 1 and 3A both of which show a first embodiment of the invention, a mixture introduced into combustion chamber 3 through intake valve 2 arranged in intake port 1 is ignited by spark plug 4 and is burnt after compression by piston 11. During this time, as intake and exhaust valves are both in closed position, position 11 is moved downwardly to its bottom dead center (B.D.C.) by the combustion energy. Piston 11 is then moved upwardly to its T.D.C., forcing burnt gas together with the unburnt hydrocarbon into exhaust port 7 through exhaust valve 5. In this case, the exhaust valve 5 is preset by, for example, timing gears (not shown) in such a way that it is opened before piston 11 reaches its B.D.C. The reason for presetting is that exhaustion can be performed by the pressure of the exhaust gas itself.

According to the invention, in exhaust port or passage 7, another exhaust valve 6 is coaxially provided on exhaust valve 5. For convenience, exhaust valves 5 and 6 are hereinafter referred to as first exhaust valve 5 and second exhaust valve 6, respectively. Second exhaust valve 6 is slidably mounted to the valve stem of the first exhaust valve 5. Both valves 5 and 6 may be individually operated by their own cams (not shown) or a single common cam 20 (see FIG. 4A).

Alternatively, second valve 5 may be formed integrally with first exhaust valve 5, though this is not shown. In this modification, the valve seat portion of the second valve 6 must be formed in such a way that the sliding length of valve 6 along the seat portion is longer than that of valve 5. In other words, even if the first exhaust valve 5 begins to move toward combustion chamber 3 and away from its valve seat portion and is in open portion, the second valve 6 is still in contact with its valve seat portion for a certain period, to temporarily form a secondary combustion chamber 12 between the two valves. Further movement of valve 5, and therefore, further movement of valve 6 places valve 6 in opened position. The above modification may be similarly effective when both valves 5 and 6 are operated independently from each other, by providing a time variation between the valve timings of both valves.

The operation of the valves according to the present invention will become more apparent from FIG. 3A in which T.D.C. (0°%) represents the top dead center of piston 11; B.D.C. (180°%) the bottom dead center; small letters $o$, $o'$ the opening of valves 5 and 6; small letters $c$, $c'$ the closing of valves 5 and 6; $V_1$ the first exhaust valve 5; $V_2$ the second exhaust valve 6.

The first exhaust valve 5 is, as mentioned above, opened at the point indicated by $5_o$ (preferably 70°–110° B.D.C.) before the piston the piston 11 reaches its B.D.C., preferably with earlier valve timing than that of a conventional exhaust valve. Preferably, the second exhaust valve 6 is set so that the valve opening timing is approximately equal to that of a conventional exhaust valve. That is, at point $5_o$, the first exhaust valve 5 is open but the second exhaust valve is still in closed position. The second valve 6 begins to open at point $6_o$. Accordingly, a timing delay corresponding to the crank angle $\alpha$ (preferably 20°–50°) is provided between the two exhaust valves. Now, in an area corresponding to the crank angle $\alpha$, as the first valve 5 remains open and the second valve 6 remains in closed position, a new space comprising the secondary combustion chamber 12 and combustion chamber 3, which now communicates with chamber 12, is formed. Therefore, the unburnt hydrocarbon is discharged together with the burnt matter into a part of exhaust port 7 forming a secondary combustion chamber 12 through the first exhaust valve 5, but is not discharged out of the engine because the second exhaust valve 6 is in closed position. Accordingly, the unburnt hydrocarbon remaining in the boundary layer adjacent to the inner circumference of the combustion chamber 3 is, when discharged into the secondary combustion chamber 12 because of a rapid pressure change resulting from the opening of the first exhaust valve 5, mixed again with high temperature burnt gas to enable a more complete combustion. The remaining gas thus burnt is discharged into the exhaust passage and out of the engine through the second exhaust valve 6 when the valve is opened. In this case, as compared with the conventional four cycle engines, more momentary, rapid variations in temperature and pressure are provided by the fact that the first exhaust valve 5 is opened at an earlier time during the expansion stroke, thereby restricting the $NO_x$ level produced during the expansion stroke. The intake valve 2 is opened before the exhaust stroke is finished, that is, before piston 11 reaches its T.D.C., though this is not shown, to utilize the inertia of the flowing mixture, in the same way as conventional four cycle engines. In FIG. 3A, it will be easily understood that the crank angles $\alpha$ and $\beta$ (preferably several degrees) which respectively correspond to opened timing difference (point $5_o$, $6_o$) and closed timing difference (point $5_c$, $6_c$) between the first exhaust valve 5 and second exhaust valve 6 may be optionally changed and that crank angle $\alpha$ is equal to crank angle $\beta$ when both exhaust valves are integrally constructed. In the event that both exhaust valves are operated independently from each other, it will also be possible to equalize the crank angle $\beta$ to zero, that is, to equalize the closed timing of both exhaust valves.

Figure 2:
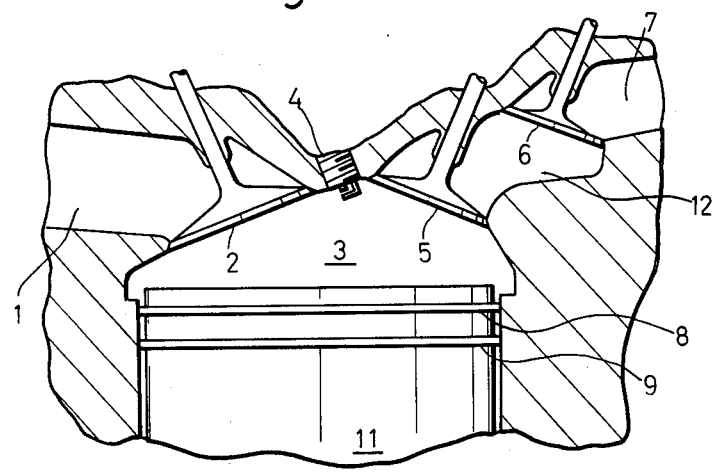
FIG. 2 shows a schematic view of another embodiment of the present invention.
Figure 3B:
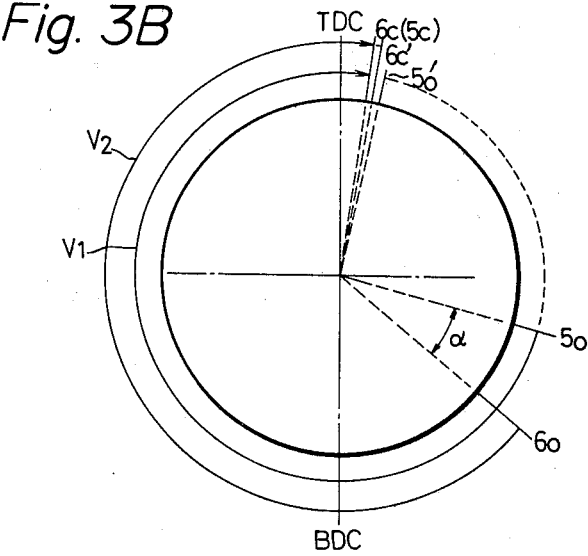

FIGS. 2 and 3B show another embodiment of the present invention. An internal combustion engine according to this embodiment is essentially similar to that of the first embodiment, except that the two exhaust valves 5 and 6 are independently provided and arranged in the second embodiment. However, both valves may be integrally or independently operated. In this embodiment also, the opening timing of the second exhaust valve 6 is substantially equal to that of the conventional exhaust valve and the opening timing of the first valve 5 is earlier than that of the second valve 6. In other words, the first exhaust valve 5, according to this invention, is opened earlier than the conventional exhaust valve which, in turn, is usually set in such a way that it is opened before the piston reaches its B.D.C.

The operation of an internal combustion engine according to the second embodiment will be explained in detail, referring to FIG. 3B. Essentially, the operation is similar to that indicated by FIG. 3A. That is, the first exhaust valve 5 is opened at point $5_o$ after piston 11 begins to move downwardly. At this time, the second exhaust valve 6 remains closed. As a result of this, remaining unburnt hydrocarbon is burnt during the phase indicated by crank angle $\alpha$ which corresponds to the difference of opening timings between the first and the second exhaust valves 5 and 6. In the second embodiment, second valve 6 can to some extent be optionally arranged in the exhaust port with respect to the first valve 5, because the second valve 6 is formed independent of the first valve 5. Therefore, if a large-volume secondary combustion chamber is necessary, this second embodiment would be advantageous. The opening and closing timings of both exhaust valves 5 and 6 may be varied, for example, the second exhaust valve 6 may be closed at the same time as or later (point $6_c'$) than the first exhaust valve 5 and the first exhaust valve 5 may be opened at point $5_o'$ which is within a 90° angle from T.D.C. In FIGS. 1 and 2, 8 and 9 are conventional compression rings.

Figure 4A:
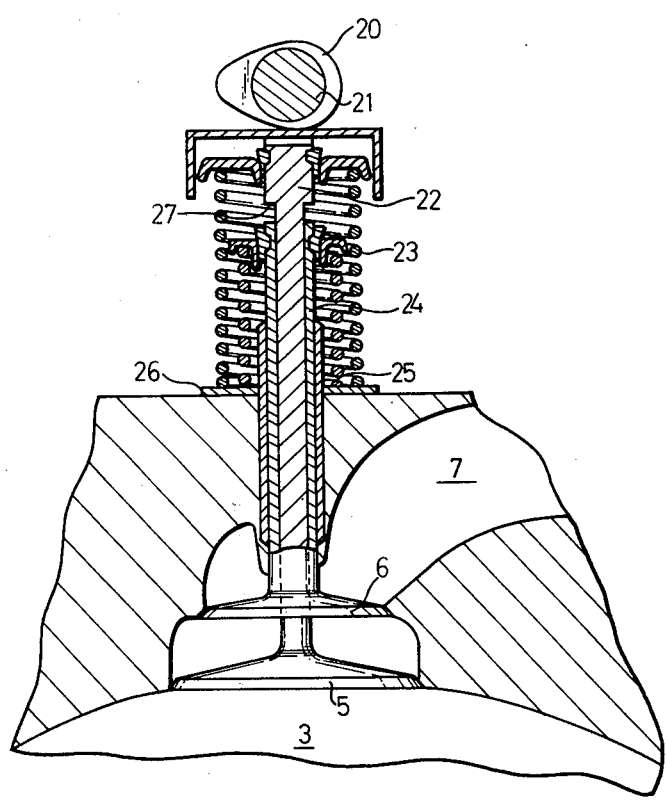
FIGS. 4A and 4B show operating mechanisms of the exhaust valves corresponding respectively to the first and second embodiments.
Figure 4B:
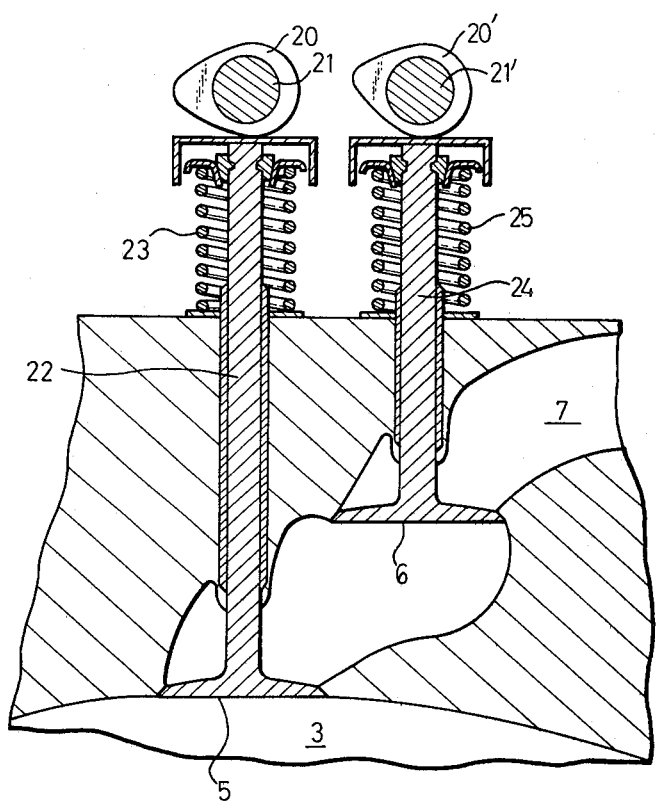

FIGS. 4A and 4B show operating mechanisms of the exhaust valves, corresponding respectively to the first embodiment (FIGS. 1 and 3A) and the second embodiment (FIGS. 2 and 3B). Each valve 5 and 6, is operated similar to the conventional exhaust valve. In FIG. 4A, the valve stem 22 of the first exhaust valve 5 is first moved downwardly against valve spring 23, by cam 20 rotated with cam shaft 21, to open the first exhaust valve 5. When valve stem 22 is further moved downwardly, valve stem 24 of the second valve 6 is also moved downwardly against valve spring 25, by shoulder 27 of the valve stem 22 to open valve 6. 26 is the spring seat for valve spring 23 and 25. In this case, the timing difference between the two valves 5 and 6 can be easily controlled by controlling the distance between the shoulder 27 of valve stem 22 and the top surface of valve stem 24.

In FIG. 4B the operating mechanisms of the valves 5 and 6 are basically similar to that of FIG. 4A. The first exhaust valve 5 is opened by valve stem 22 which is moved downwardly against valve spring 23 by rotation of cam 20, and the second valve 6 is opened by valve stem 24 which is moved downwardly against valve spring 25 by rotation of cam 20'. The timing difference between the two valves 5 and 6 can be easily provided by changing the angular positions of cams 20 and 20' as shown in FIG. 4B.

An internal combustion engine according to the present invention, as stated above, makes it possible to decrease the amount of unburnt hydrocarbon which is finally exhausted out of the engine, since the engine has two exhaust valves, whereby a secondary combustion chamber is temporarily formed between the two valves and secondary combustion of the remaining unburnt hydrocarbon may occur therein. In addition to this, because the first exhaust valve is designed according to the invention, in a way such that it is opened earlier than the exhaust valve of a conventional four cycle engine, the first exhaust valve is opened before the temperature and pressure in the combustion chamber reach their maximum values, in other words, the values of the maximum temperature and pressure in the combustion chamber may be lower than those of conventional four cycle engines. As a result of this, the creation of $NO_x$ which is influenced by the above two factors can be decreased. It has been experimentally confirmed that the amount of the unburnt hydrocarbon which is exhausted out of the engine, in the internal combustion engine according to the present invention, is reduced by about half as compared to conventional four cycle engines.

I claim:

1. A four-stroke cycle internal combustion engine of the type having a combustion chamber, carburetor means for introducing a combustible mixture of fuel and air into the chamber, a cyclically movable power member fitted in the chamber for expanding the effective volume of the chamber from a minimum value to a maximum value in response to combustion of the mixture, a fixed volume exhaust passage opening from the chamber, an exhaust manifold connected to the exhaust passage for conducting the exhaust gases from the combustion chamber to the outside atmosphere, a first exhaust valve postioned in the opening of the exhaust passage for passing all of the gases exhausted from the chamber into the exhaust passage, and means for opening the first exhaust valve during a predetermined portion of each cycle of power member movement commencing prior to the completion of the expansion stroke of the power member, wherein the improvement comprises:

a second exhaust valve arranged in the exhaust passage and spaced downstream from the first exhaust valve by a distance sufficient to form a fixed volume secondary combustion chamber in the exhaust passage sized smaller than the combustion chamber to hold a predetermined initial fraction of the flow of the exhaust gases from the combustion chamber that contain a high proportion of unburned and partially burned fuel components from the region adjacent to the walls of the combustion chamber and means for opening the second valve to pass all of the gases admitted to the exhaust passage through the first valve to the exhaust manifold at a predetermined time after the opening of the first valve, said predetermined time being sufficient to permit further combusting of the unburned and partially burned components of the hot exhaust gases in the secondary combustion chamber.

2. A four-stroke cycle internal combustion engine of the type having a combustion chamber, means for introducing a combustible mixture of fuel and air into the chamber, a cyclically movable power member fitted in the chamber for expanding the effective volume of the chamber from a minimum value to a maximum value in response to combustion of the mixture, an exhaust passage opening from the chamber, an exhaust system connected to the exhaust passage for conducting the exhaust gases from the combustion chamber to the outside atmosphere, a first exhaust valve positioned in the opening of the exhaust passage for passing all of the gases exhausted from the chamber into the exhaust passage, the first valve including a first valve stem, and means for opening the first exhaust valve during a predetermined portion of each cycle of power member movement commencing prior to the completion of the expansion stroke of the power member, wherein the improvment comprises:

a second exhaust valve arranged in the exhaust passage and spaced downstream from the first exhaust valve by a distance sufficient to form a fixed volume secondary combustion chamber in the exhaust passage sized smaller than the combustion chamber to hold a predetermined initial fraction of the flow of the exhaust gases from the combustion chamber that contain a high proportion of unburned and partially burned fuel components from the region adjacent to the walls of the combustion chamber, the second exhaust valve including a second valve stem arranged for slidable movement coaxially with respect to the first valve stem, and means for opening the first valve and the second valve to pass all of the gases admitted to the exhaust passage through the first valve to the exhaust manifold at a predetermined time after the opening of the first valve including a single common cam driven in synchronism with the power member and means for coupling the cam to the first and second valve stems so that the opening timing of the first exhaust valve is earlier than that of the second exhaust valve, said predetermined time being sufficient to permit further combusting of the unburned and partially burned components of the hot exhaust gases in the secondary combustion chamber.

3. The engine of claim 2 wherein the means for coupling the cam to the first and second valve stems comprises a stop member on one of said valve stems for engaging the other of said valve stems after the first valve stem has moved a predetermined distance in response to the cam sufficient to open the first valve, whereby further opening movement of the first valve stem causes the second valve stem to move and open the second valve.

4. The engine of claim 2 wherein the second valve stem comprises a hollow tube, the first valve stem is slidably mounted within said hollow tube, and the means for coupling the cam to the first and second valve stems comprises a shoulder on the first valve stem spaced axially from the end of the tubular valve stem when both valves are closed so that movement of the first valve stem in response to movement of the cam will cause the first valve to open the second valve after the shoulder contacts the end of the second valve stem.

5. A four-stroke cycle internal combustion engine of the type having a combustion chamber, carburetor means for introducing a combustible mixture of fuel and air into the chamber, a cyclically movable power member fitted in the chamber for expanding the effective volume of the chamber from a minimum value to a maximum value in response to combustion of the mixture, an exhaust passage opening from the chamber, an exhaust system connected to the exhaust passage for conducting the exhaust gases from the combustion chamber to the outside atmosphere, a first exhaust valve positioned in the opening of the exhaust passage for passing all of the gases exhausted from the chamber into the exhaust passage, and means for opening the first exhaust valve during a predetermined portion of each cycle of power member movement commencing prior to the completion of the expansion stroke of the power member, the means for opening the first valve including a first cam driven in synchronism with the power member, wherein the improvement comprises:

a second exhaust valve arranged in the exhaust passage and spaced downstream from the first exhaust valve by a distance sufficient to form a fixed volume secondary combustion chamber in the exhaust passage sized smaller than the combustion chamber to hold a predetermined initial fraction of the flow of the exhaust gases from the combustion chamber that contain a high proportion of unburned and partially burned fuel components from the region adjacent to the walls of the combustion chamber and means for opening the second valve to pass all of the gases admitted to the exhaust passage through the first valve to the exhaust manifold at a predetermined time after the opening of the first valve including a second cam driven in synchronism with the power member, the first cam being preset in relation to the second cam to open the first exhaust valve before the second cam opens the second valve, said predetermined time being sufficient to permit further combusting of the unburned and partially burned components of the hot exhaust gases in the secondary combustion chamber.

6. The engine of claim 1 wherein the means for opening the second valve is preset to open said valve immediately before the power member has completed the expansion stroke.

* * * * *

UNITED STATES PATENT AND TRADEMARK OFFICE
CERTIFICATE OF CORRECTION

PATENT NO. : 3,938,482
DATED : February 17, 1976
INVENTOR(S) : Hideaki Akamatsu

It is certified that error appears in the above-identified patent and that said Letters Patent are hereby corrected as shown below:

Column 2, line 34 - change "position" second occurrence to -- piston --.
Column 2, line 61 - change "portion" to --position--

Column 3, line 5 - omit "%"

Column 3, line 6 - omit "%"

Column 6, line 8 - change "improvment" to --improvement--

*Signed and Sealed this*

*fourth* Day of *May 1976*

[SEAL]

Attest:

RUTH C. MASON
*Attesting Officer*

C. MARSHALL DANN
*Commissioner of Patents and Trademarks*